United States Patent
Li et al.

(10) Patent No.: US 11,615,306 B2
(45) Date of Patent: Mar. 28, 2023

(54) STATICALLY GENERATED COMPILED REPRESENTATIONS FOR PROCESSING DATA IN NEURAL NETWORKS

(71) Applicant: Advanced Micro Devices, Inc., Santa Clara, CA (US)

(72) Inventors: Xiuyu Li, Shenzen (CN); Jian Yang, Shanghai (CN)

(73) Assignee: Advanced Micro Devices, Inc., Santa Clara, CA (US)

(*) Notice: Subject to any disclaimer, the term of this patent is extended or adjusted under 35 U.S.C. 154(b) by 285 days.

(21) Appl. No.: 16/894,025

(22) Filed: Jun. 5, 2020

(65) Prior Publication Data

US 2021/0334648 A1 Oct. 28, 2021

(30) Foreign Application Priority Data

Apr. 28, 2020 (CN) .......................... 202010348056.1

(51) Int. Cl.
*G06N 3/08* (2006.01)
*G06N 3/04* (2023.01)

(52) U.S. Cl.
CPC ............... *G06N 3/08* (2013.01); *G06N 3/04* (2013.01)

(58) Field of Classification Search
CPC .. G06N 3/02; G06N 3/08; G06N 3/04; G06N 3/105; G06N 3/067; G06N 3/0454; G06N 3/063; G06F 8/41; G06F 17/16; G06F 30/27
USPC ........................................................... 706/20
See application file for complete search history.

(56) References Cited

U.S. PATENT DOCUMENTS

| | | | |
|---|---|---|---|
| 2019/0114534 A1* | 4/2019 | Teng | G06N 3/063 |
| 2019/0205746 A1* | 7/2019 | Nurvitadhi | G06K 9/6256 |
| 2020/0167943 A1* | 5/2020 | Kim | G06K 9/6267 |
| 2021/0042115 A1* | 2/2021 | Stephens | G06F 9/383 |
| 2021/0097375 A1* | 4/2021 | Huynh | G06F 9/5027 |
| 2021/0201124 A1* | 7/2021 | Gelashvili | G06N 3/063 |

\* cited by examiner

*Primary Examiner* — Paul Dinh
(74) *Attorney, Agent, or Firm* — Park, Vaughan, Fleming & Dowler LLP

(57) ABSTRACT

An electronic device includes a memory that stores input matrices A and B, a cache memory, and a processor. The processor generates a compiled representation that includes values for acquiring data from input matrix A when processing instances of input data through the neural network, the values including a base address in input matrix A for each thread from among a number of threads and relative offsets, the relative offsets being distances between elements of input matrix A to be processed by the threads. The processor then stores, in the local cache memory, the compiled representation including the base address for each thread and the relative offsets.

27 Claims, 11 Drawing Sheets

WI: WIDTH OF INPUT MATRIX
HI: HEIGHT OF INPUT MATRIX
R: WIDTH OF FILTER
S: HEIGHT OF FILTER
SU: FILTER U-STRIDE
SV: FILTER V-STRIDE
DU: FILTER U-DILATION
DV: FILTER V-DILATION

WO: WIDTH OF OUTPUT MATRIX
HO: HEIGHT OF OUTPUT MATRIX
BS: BATCH SIZE
INC : INPUT CHANNELS
ONC : OUTPUT CHANNELS

FIG. 8

```
PIX = TID % (HO*WO)
IBS = TID / (HO*WO)
BASE_ADDR_A[TID] += (IBS*HI*WI*INC+SV*(PIX/WO)*WS+SU*(PIX%WO))*SIZEOF(ELEM_TYPE)
```

FIG. 9

```
I = 0
FOR(C=0; C<INC; ++C ){
        FOR( V=0; V<S; ++V ){
                FOR( U=0; U<R; ++U ){
                        RELO[I++]=(C*HI*WI+DV*V*WI+DU*U)*SIZEOF(ELEM_TYPE)
                }
        }
}
```

FIG. 10

```
FOR( CHANNEL=0; CHANNEL<ONC; ++CHANNEL ){
    TIDX = TIDX<BS*H*W?TIDX:(BS*H*W-1)
    AVO = START_ADDR_A[TIDX]
    C = 0
    FOR( K=0; K<INC*R*S; ++K ){
       URO = RELO[K]
       AVO += URO
       A  = SCALAR_BASE_A[AVO]
       B  = SCALAR_BASE_B[K]
       C += A*B
    }
    IF(TIDX<BS*H*W){
       NPIX = H*W
       OUTPUT_IDX = CHANNEL*NPIX+(TIDX/NPIX)*ONC*H*W+(TIDX%NPIX)
       C[OUTPUT_IDX] = C
    }
 }
```

FIG. 12

WS=4, HS=4, R=3, S=3, SU=1, SV=1, DU=1, DV=1, INC=1, BS=1

A[HS][WS] = { 1, 3, 2, 7,
5, 6, 0, 3,
9, 2, 2, 1,
4, 7, 6, 8 }

B[R][S] = { b00, b01, b02,
b10, b11, b12,
b20, b21, b22 }

START_ADDR_A[ ] = { 0, 1, 4, 5 }

RELO[ ] = { 0, 1, 2, 4, 5, 6, 8, 9, 10 }

```
A0 = A + START_ADDR_A[0]

C[0][0] =   A0[RELO[0]]*B[0][0]+A0[RELO[1]]*B[0][1]+A0[RELO[2]]*B[0][2]
            A0[RELO[3]]*B[1][0]+A0[RELO[4]]*B[1][1]+A0[RELO[5]]*B[1][2]
            A0[RELO[6]]*B[2][0]+A0[RELO[7]]*B[2][1]+A0[RELO[8]]*B[2][2]

=   1*B[0][0]+3*B[0][1]+2*B[0][2]
            5*B[1][0]+6*B[1][1]+0*B[1][2]
            9*B[2][0]+2*B[2][1]+2*B[2][2]
```
THREAD0

```
A1 = A + START_ADDR_A[1]

C[0][1] =   A1[RELO[0]]*B[0][0]+A1[RELO[1]]*B[0][1]+A1[RELO[1]]*B[0][2]
            A1[RELO[3]]*B[1][0]+A1[RELO[4]]*B[1][1]+A1[RELO[5]]*B[1][2]
            A1[RELO[6]]*B[2][0]+A1[RELO[7]]*B[2][1]+A1[RELO[8]]*B[2][2]

=   3*B[0][0]+2*B[0][1]+7*B[0][2]
            6*B[1][0]+0*B[1][1]+3*B[1][2]
            2*B[2][0]+2*B[2][1]+1*B[2][2]
```
THREAD1

```
A2=A+START_ADDR_A[2]

C[1][0] =   A2[RELO[0]]*B[0][0]+A2[RELO[1]]*B[0][1]+A2[RELO[1]]*B[0][2]
            A2[RELO[3]]*B[1][0]+A2[RELO[4]]*B[1][1]+A2[RELO[5]]*B[1][2]
            A2[RELO[6]]*B[2][0]+A2[RELO[7]]*B[2][1]+A2[RELO[8]]*B[2][2]

=   5*B[0][0]+6*B[0][1]+0*B[0][2]
            9*B[1][0]+2*B[1][1]+2*B[1][2]
            4*B[2][0]+7*B[2][1]+6*B[2][2]
```
THREAD2

```
A3=A+START_ADDR_A[3]

C[1][1] =   A3[RELO[0]]*B[0][0]+A3[RELO[1]]*B[0][1]+A3[RELO[1]]*B[0][2]
            A3[RELO[3]]*B[1][0]+A3[RELO[4]]*B[1][1]+A3[RELO[5]]*B[1][2]
            A3[RELO[6]]*B[2][0]+A3[RELO[7]]*B[2][1]+A3[RELO[8]]*B[2][2]

=   6*B[0][0]+0*B[0][1]+3*B[0][2]
            2*B[1][0]+2*B[1][1]+1*B[1][2]
            7*B[2][0]+6*B[2][1]+8*B[2][2]
```
THREAD3

FIG. 13

THREAD0 START ADDRESS = 0*W+0 = 0

A[HS][WS] = {  1, 3, 2, 7,
               5, 6, 0, 3,
               9, 2, 2, 1,
               4, 7, 6, 8 }

A0 = { 1, 3, 2, 5, 6, 0, 9, 2, 2 }

THREAD1 START ADDRESS = 0*W+1 = 1

A[HS][WS] = {  1, 3, 2, 7,
               5, 6, 0, 3,
               9, 2, 2, 1,
               4, 7, 6, 8 }

A1 = { 3, 2, 7, 6, 0, 3, 2, 2, 1 }

THREAD2 START ADDRESS = 1*W+0 = 4

A[HS][WS] = {  1, 3, 2, 7,
               5, 6, 0, 3,
               9, 2, 2, 1,
               4, 7, 6, 8 }

A2 = { 5, 6, 0, 9, 2, 2, 4, 7, 6 }

THREAD3 START ADDRESS = 1*W+1 = 5

STATICALLY GENERATED COMPILED REPRESENTATIONS FOR PROCESSING DATA IN NEURAL NETWORKS

RELATED APPLICATIONS

The instant application claims priority to Chinese patent application no. 202010348056.1, which was filed in the Chinese Patent Office on 28 Apr. 2020, and which is incorporated herein by reference in its entirety.

BACKGROUND

Related Art

Some electronic devices perform operations for artificial neural networks or, more simply, "neural networks." Generally, a neural network is a computational structure that includes internal elements having similarities to biological neural networks, such as those associated with a living creature's brain. Neural networks can be trained to perform specified tasks by using known instances of training data to configure the internal elements of the neural network so that the neural network can perform the specified task on unknown instances of input data. For example, one task performed by neural networks is identifying whether (or not) an image includes image elements such as faces or vehicles. When training a neural network to perform image identification, images that are known to include (or not) the image element are processed through the neural network to configure the internal elements to generate appropriate outputs when subsequently processing unknown images to identify whether the image elements are present in the unknown images.

One type of neural network is a "fully connected" neural network. Fully connected neural networks include, in their internal elements, a set of artificial neurons, or "nodes," that are interconnected with one another in an arrangement having some similarity to how neurons are interconnected via synapses in a living creature's brain. A fully connected neural network can be visualized as a form of weighted graph structure in which the nodes include input nodes, intermediate (or "hidden") nodes, and output nodes. FIG. 1 presents a block diagram illustrating a fully connected neural network 100 including input nodes 102, intermediate nodes 104 in layers 110 and 112, output nodes 106, and directed edges 108 (only two directed edges and layers are labeled for clarity). Within the fully connected neural network, each node other than output nodes 106 is connected to one or more downstream nodes via a directed edge that has an associated weight. During operation, input nodes 102 in a first layer of fully connected neural network 100 receive inputs from an external source and process the inputs to produce input values. Input nodes 102 forward the input values to intermediate nodes 104 in the next layer 110 of fully connected neural network 100. The receiving intermediate nodes 104 weight the received inputs based on a weight of a corresponding directed edge, i.e., adjust the received inputs such as multiplying by a weighting value, etc. Each intermediate node 104 sums the corresponding weighted received inputs and possibly a bias value to generate an internal value and evaluates an activation function for that intermediate node 104 using the internal value to produce a result value. Intermediate nodes 104 then forward the result values as input values to intermediate nodes 104 in the next layer 112 of fully connected neural network 100, where the input values are used to generate internal values and evaluate an activation function as described above. In this way, values progress through intermediate nodes 104 in layers of fully connected neural network 100 until a last layer of intermediate nodes 104 forward result values to output nodes 106 for fully connected neural network 100, which generate outputs for fully connected neural network 100. Continuing the example above, the outputs produced by output nodes 106—and thus from fully connected neural network 100—can be in a form, e.g., a number between 0-1, that indicates whether or not an image is likely to include (or not) a specified image element.

As described above, values forwarded along directed edges between nodes in a fully connected neural network (e.g., fully connected neural network 100) are weighted in accordance with a weight associated with each directed edge. By setting the weights associated with the directed edges during a training process so that desired outputs are generated by the fully connected neural network, the fully connected neural network can be trained to produce intended outputs such as the above-described identification of image elements in images. When training a fully connected neural network, numerous instances of training data having expected outputs are processed in the fully connected neural network to produce actual outputs from the output nodes. Continuing the example above, the instances of training data would include digital images that are known to include (or not) particular image elements, and thus for which the fully connected neural network is expected to produce outputs that indicate that the image element is likely present (or not) in the images. After each instance of training data is processed in the fully connected neural network to produce an actual output, an error value, or "loss," between the actual output and a corresponding expected output is calculated using mean squared error, log loss, or another algorithm. The loss is then worked backward through the fully connected neural network, or "backpropagated" through the fully connected neural network, and used to adjust the weights associated with the directed edges in the fully connected neural network in order to reduce the error for the instance of training data. The backpropagation operation adjusts the fully connected neural network's response for that particular instance of training data and all subsequent instances of input data. For example, one backpropagation technique, which can be called gradient descent, involves computing a gradient of the loss with respect to the weight for each directed edge in the fully connected neural network. Each gradient is then multiplied by a training coefficient or "learning rate" to compute a weight adjustment value. The weight adjustment value is next used in calculating an updated value for the corresponding weight, e.g., added to an existing value for the corresponding weight.

Another type of neural network is a "convolutional" neural network. FIG. 2 presents a block diagram illustrating convolutional neural network 200. As can be seen in FIG. 2, the internal elements of convolutional neural network 200 can be grouped into feature processing elements 202 and classification elements 204. Feature processing elements 202 process features in instances of input data 216 (e.g., digital images, digital audio recordings, etc.) in preparation for the classification of the features in classification elements 204. Feature processing elements 202 include internal elements for convolution, normalizing, and pooling. In the convolution 208 internal elements, a set of filters are used to generate feature maps from instances of input data. The feature maps are then normalized (e.g., using rectified linear units) in the normalizing 210 internal elements. After being processed in the normalizing 210 internal elements, the feature maps are further processed (e.g., subsampled, downsampled, etc.) in the pooling 212 internal elements to generate reduced-dimension feature maps. Flattening 214 internal elements next prepare the reduced-dimension feature maps from the pooling 212 internal elements for input into the fully connected 206 internal elements. Classification elements 204 include a fully connected 206 neural network (similar to the fully-connected neural network described above) that classifies inputs (i.e., flattened reduced-dimension feature maps) as including specified elements (or not) and produces outputs 218 representing the classification. As with the fully connected neural network, backpropagation (i.e., gradient descent, etc.) can be used to train the convolution 208 internal elements by adjusting values in the set of filters and possibly other values in the internal elements of feature processing elements 202.

The examples of the fully connected and convolutional neural network shown in FIGS. 1 and 2 are simplified. In almost all cases, fully connected neural networks include many more layers and/or nodes. In practice, fully connected neural networks for many applications can have thousands or millions of nodes arranged in large numbers of layers. In addition, the feature processing elements for convolutional neural networks may have multiple/repeated layers of convolution, normalizing, and pooling internal elements. The examples in FIGS. 1 and 2 are also generic; fully connected and/or convolutional neural networks may include different arrangements of internal elements and/or internal elements that are not shown in FIGS. 1-2. Generally, processing instances of input data through a fully connected or convolutional neural network involves a large number of internal elements—and is therefore computationally intensive.

Due to the arrangement of elements in many neural networks (e.g., feature processing elements, nodes, etc.), operations such as computing gradients for training and computing internal values for activation functions in a fully connected neural network and using filters to generate feature maps in a convolutional neural network are often performed using matrix mathematical operations. In other words, input data, weights, filter values, etc. are arranged in matrices and then matrix mathematical operations are used for performing the above-described computations. In many cases, general matrix multiplication (GEMM) operations, which are part of the well-known Basic Linear Algebra Subprograms (BLAS) specification, are used for performing the matrix mathematical operations. In accordance with the BLAS specification, GEMM operations require two dimensional inputs. Because the matrices used for neural network computations often have higher numbers of dimensions (i.e., three or more dimensions) and/or have data that can be organized in a number of different ways, such matrices must be converted or translated from the higher dimension format stored in the memory into the two dimensional format used for GEMM operations. For this purpose, designers have developed customized program code, sometimes called "kernels," for processing higher-dimension input matrices and/or organizations of data in the input matrices. The program code/kernels convert or translate matrices of values into the two dimensional formats needed for GEMM operations and then perform the GEMM operations. Developing, maintaining, and properly using customized program code/kernels for neural network processing is time-consuming, difficult, and subject to errors. In addition, converting or translating, in the program code/kernels, matrices from the higher dimension formats into the two dimensional format used for GEMM operations significantly slows the GEMM operations. This is true because the program code/kernels, along with the GEMM operations, must compute, on the fly, addresses for locations in memory where matrix data is stored. Moreover, the program code/kernels can be inefficient in terms of memory access locality, particularly among sequential executions of the program code/kernels, which can make the overall process of executing the program code/kernels inefficient. In other words, between multiple sequential executions of program code/kernels (e.g., by different processing threads in a multi-threaded processing subsystem), the program code/kernels may repeatedly load, and thus overwrite, cache lines into a cache memory when only a small portion of the data in the cache lines is actually used.

BRIEF DESCRIPTION OF THE FIGURES

FIG. 8 presents a key describing factors or values used in expressions in accordance with some embodiments.

FIG. 9 presents a pseudocode example of the computation of base addresses for a compiled representation in accordance with some embodiments.

FIG. 10 presents a pseudocode example of the computation of relative offsets for a compiled representation in accordance with some embodiments.

FIG. 12 presents a pseudocode example of using a compiled representation in accordance with some embodiments.

FIG. 13 presents an example of using a compiled representation in accordance with some embodiments.

FIG. 14 presents an example of sets of elements of an input matrix in accordance with some embodiments.

Throughout the figures and the description, like reference numerals refer to the same figure elements.

DETAILED DESCRIPTION

Figure 1:
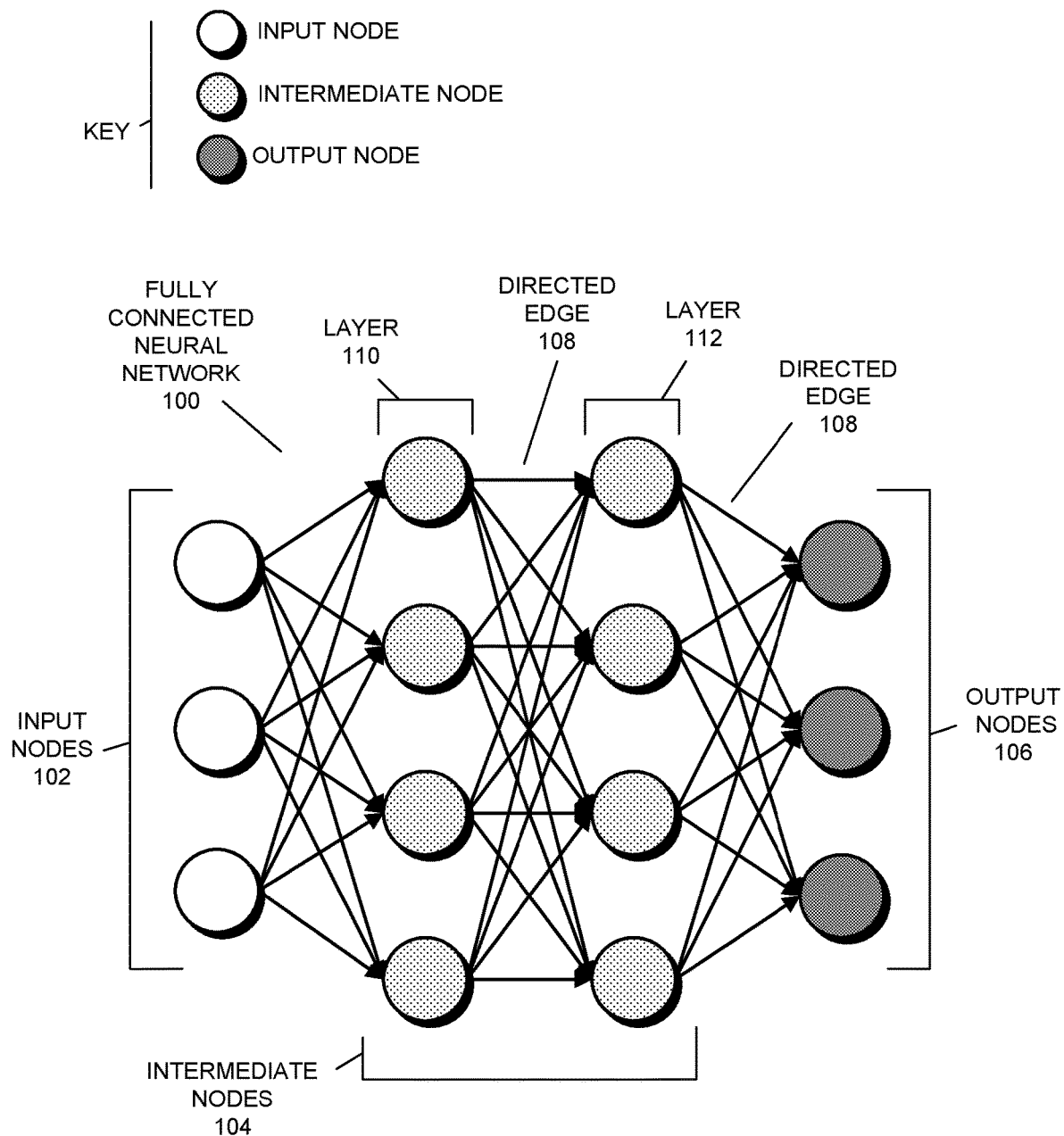
FIG. 1 presents a block diagram illustrating a fully connected neural network.
Figure 2:
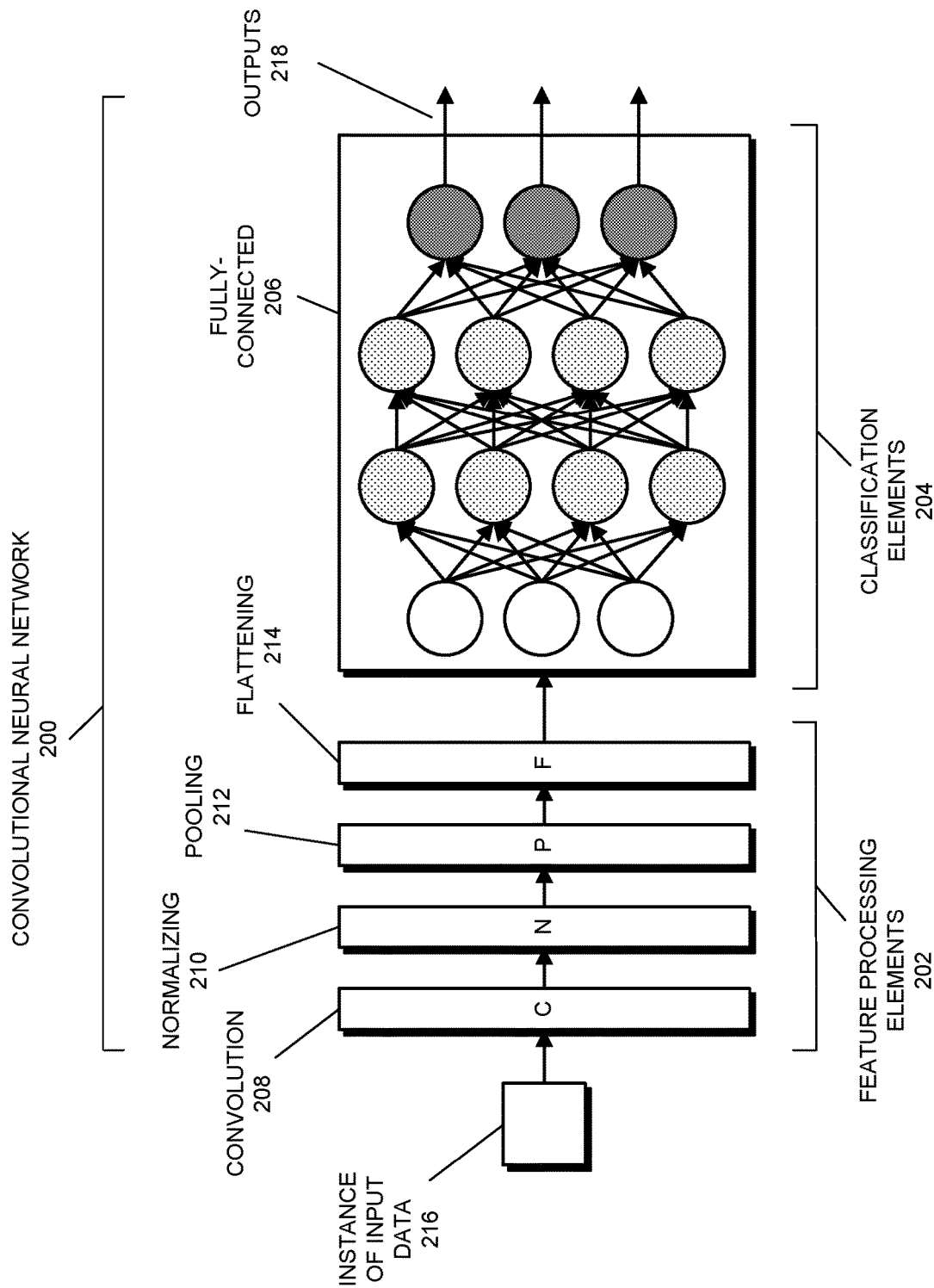
FIG. 2 presents a block diagram illustrating convolutional neural network.

The following description is presented to enable any person skilled in the art to make and use the described embodiments and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of some of these terms. Note that these terms may have significant additional aspects that are not recited herein for clarity and brevity and thus the description is not intended to limit these terms.

Functional block: functional block refers to a group, collection, and/or set of one or more interrelated circuit elements such as integrated circuit elements/circuitry, discrete circuit elements/circuitry, etc. The circuit elements are "interrelated" in that circuit elements share at least one property. For example, the interrelated circuit elements may be included in, fabricated on, or otherwise coupled to a particular integrated circuit chip, substrate, circuit board, or portion thereof, may be involved in the performance of given functions (computational or processing functions, memory functions, etc.), may be controlled by a common control element and/or a common clock, etc. A functional block can include circuitry having any number of circuit elements, from a single circuit element (e.g., a single integrated circuit logic gate or discrete circuit element) to millions or billions of circuit elements (e.g., an integrated circuit memory).

Threads: a thread is an abstract entity that represents or identifies execution of sections of program code, or "kernels," for performing tasks on processing hardware in a processing subsystem (e.g., a central processing unit or graphics processing unit). The processing hardware can include separate circuitry (e.g., registers, flags, etc.) for each thread from among a number (and possibly a large number) of supported threads and thus can store and keep track of each thread's respective operating state. In some embodiments, one or more of multiple supported threads are active at a time and thus having respective program code executed. The remaining threads are inactive, and thus queued, awaiting the availability of processing hardware resources, the return of data from memory, etc. In some embodiments, computational jobs such as processing instances of data through a neural network are divided up and portions of the computational jobs are allocated to individual threads from among multiple threads for processing. For example, individual matrix operations such as matrix mathematical operations for multi-dimensional input matrices that are used for processing instances of input data through a neural network may be performed using multiple threads.

General Matrix Multiplication Operations

In the described embodiments, general matrix multiplication (GEMM) operations are used for computing values when processing instances of input data through a neural network. Generally, GEMM operations are implemented in accordance with a specification such as the well-known Basic Linear Algebra Subprograms (BLAS) specification or the like and include (or are used for) matrix-matrix operations such as multiplication, fused multiply add (FMA), etc. In some embodiments, the program code for GEMM subroutines is included in a library such as a mathematical library—and thus can be called by operating systems, application programs, and other software routines that are executed by processing subsystems in electronic devices.

In some embodiments, the subroutines for GEMM operations are configured to accept particular formats and/or dimensionality of input matrices. For example, in some embodiments, the GEMM operations use—and may require—a specified two dimensional input format for input matrices. For instance, one well-known version of GEMM in the BLAS specification, DGEMM, is of the format C:=alpha*op(A)*op(B)+beta*C, where alpha and beta are scalars, and A, B and C are matrices, with op(A) being an M by K matrix, op(B) being a K by N matrix and C being an M by N matrix, where K, M, and N are integers.

In the described embodiments, GEMM operations can be decomposed or divided into a number of separate sub-operations for execution on a multi-threaded processing subsystem. In these embodiments, some or all of the threads from a set of threads supported by the processing subsystem are tasked with performing one or more sub-operations of the overall GEMM operation. For example, if the GEMM operation is used as part of a fused multiply add (FMA) in which elements of two matrices are multiplied together and then the results of the multiplication are summed to generate a final result of the FMA, each individual thread can be used for performing one or more of the multiplication operations of the GEMM and the addition operations of the FMA.

Neural Network

As described above, a neural network is a computational structure that includes internal elements (e.g., nodes, directed edges, feature processing elements, etc.) that are trained to perform specified tasks using or on instances of input data. In the described embodiments, as part of operations for processing instances of input data through neural networks, the threads perform GEMM operations for computing specified values. For example, in some embodiments, processing threads in a processing subsystem use input data values from a first input matrix and weight values from a second input matrix as inputs into a GEMM operation for computing internal values for nodes in a fully connected neural network. As another example, in some embodiments, the threads use values from input matrices as inputs into GEMM operations for convolution computations in feature processing elements of a convolutional neural network. As described in more detail below, when processing instances of input data in a neural network, higher-dimension input matrices are translated or converted, using a compiled representation, into a format that can be used in two dimensional GEMM operations.

Overview

In the described embodiments, an electronic device includes a processing subsystem (e.g., a graphics processing unit or a central processing unit), a memory (e.g., a "main" memory), and a local cache memory for the processing subsystem. The processing subsystem performs operations for processing instances of input data through a neural network using a number of threads that are supported by the processing subsystem. As part of the operations for processing the instances of input data through the neural network, the threads perform general matrix multiplication (GEMM) operations for computing specified values.

As described above, GEMM operations can use—and may require—two dimensional inputs. The described embodiments, however, can operate on higher dimension input matrices (i.e., three or more dimensions) when processing instances of input data in neural networks. For example, in some embodiments, the input matrices are organized in the well known four dimensional NCHW (where N=batch, C=channel, H=height, W=width) or CNHW formats, the five dimensional NCHWVector format, etc. Because the data in the input matrices is stored in the memory in accordance with a given higher dimension format, addresses in memory where the data to be processed by each thread are located are determined before the data can be used in GEMM operations. In other words, the higher dimension formats are to be converted or translated to the two dimensional format used by the GEMM operations. For this operation, the described embodiments generate a "compiled representation" of the data in one of two input matrices used for GEMM operations, called input matrix A herein, that is used for determining locations in memory of data in input matrix A. Generally, the compiled representation is a record (i.e., listing, index, etc.) that includes information to be used for identifying, on a per-thread basis, the locations in memory where elements in input matrix A are stored. The compiled representation can therefore be used to acquire data from input matrix A from the memory for processing in GEMM operations by each of the threads.

In some embodiments, the information in the compiled representation is has a specified relationship with a second input matrix for the GEMM operation, which is called input matrix B herein. Generally, values from input matrix A (e.g., input data) and input matrix B (e.g., weights or convolution filter values) are processed together in GEMM operations when processing instances of input data through the neural network. The specified relationship between the compiled representation and input matrix B is such that each position in the compiled representation, which is located at a respective offset from a base address for the compiled representation, includes information for determining an address of a corresponding location in input matrix A, while the respective elements are located in the same offset from the base address of input matrix B. In other words, if position X in the compiled representation includes information for determining the address in memory for a value from input matrix A to be used in a GEMM operation, the matching value in input matrix B will be located at X offset from a base address of input matrix B. The compiled reference may therefore include no information about input matrix B (and the processor will otherwise be configured to recognize and use the specified relationship) or may include simple information about input matrix B such as a base address or location in memory of input matrix B.

In the described embodiments, the compiled representation is "statically" generated, and is thus prepared in advance for use in determining addresses of memory locations during the GEMM operation. Statically, as used herein, means that the compiled representation is generated at a time prior to when instances of input data are processed using the GEMM operation—and possibly a relatively long time before the instances of input data are processed. In some embodiments, the statically generated compiled representation is separately generated and stored in preparation for subsequently processing instances of input data through the neural network.

In some embodiments, the compiled representation includes two types of information that are used in combination to determine the location in memory of elements in input matrix A. The two types of information are: (1) per thread base addresses and (2) relative offsets. Each base address is a memory address in input matrix A that serves as a starting point or initial address for a respective thread. Each thread has a separate and different base address—and thus the compiled representation includes, for each thread, a listing of the respective base address. The relative offsets are memory offsets (e.g., numbers of elements, identifiers for elements, bytes, etc.) that are used in combination with the base address to determine locations of memory of elements in input matrix A to be processed by each thread. For example, if the base addresses are A1 and A2 for first and second threads and the relative offsets are X, Y, and Z, the locations of the memory elements to be processed by the first thread are A1+X, A1+Y, and A1+Z, and the locations of the memory elements to be processed by the second thread are A2+X, A2+Y, and A2+Z.

In some embodiments, the compiled representation is generated using a set of values associated with input matrix A, an output matrix, called output matrix C herein, properties of the neural network, and/or other values. For example, in some embodiments, computing the base address for each thread for input matrix A includes computing that base address as a function of some or all of a thread identifier for that thread, dimensions of input matrix A and/or an output matrix C, properties of elements of input matrix A and/or output matrix C, and neural network properties. As another example, in some embodiments, computing the relative offsets for input matrix A includes computing the relative offsets as a function of some or all of dimensions of input matrix A and/or an output matrix C, properties of elements of input matrix A and/or output matrix C, and neural network properties. Some example expressions for computing the base addresses and relative offsets are described below.

In some embodiments, processing instances of input data through the neural network includes using the compiled representation to acquire input data from input matrix A, as well as separately acquiring corresponding data from input matrix B. For this operation, the processing subsystem acquires the base address for each thread for input matrix A. Then, while elements of input matrix A remain to be processed, the processing subsystem uses the relative offsets from the compiled representation to acquire values for each thread for processing in the GEMM operation. More specifically, for the next thread, the processing subsystem reads a first value from an element of input matrix A at a location in the memory identified by that next thread's base address as adjusted by a corresponding relative offset from the compiled representation. The processing subsystem then reads a second value from an element of input matrix B at a memory location associated with the element of input matrix A—i.e., at a location in input matrix B that corresponds to the next thread's base address as adjusted by a corresponding relative offset. The processing subsystem then uses, as inputs to the GEMM operation for the thread, the first value and the second value. The processing subsystem next stores, in an output matrix C in the memory, a result of the GEMM operation.

In some embodiments, the compiled representation is organized so that data is acquired from input matrix A and/or input matrix B in such a way to promote the reuse of data in cache lines in the local cache. In these embodiments, data values used by two or more threads in sequence (i.e., during neighboring sequential GEMM operations) can be acquired from memory together (e.g., in sequential memory read operations) and stored in respective portions of a single cache line. In this way, the data is available in the cache for all of the two or more threads—and can help to avoid the eviction of useful data from the cache by not requiring multiple cache lines be loaded to the cache memory in order to fulfill the data needs of the two or more threads.

By using the statically-generated compiled representation to acquire data from input matrix A, the described embodiments can avoid the computation of address information during the performance of GEMM operations, which can significantly speed up the GEMM operations. The usage of the compiled representation can also mean that the same kernel (or other program code) can be used for the performance of GEMM operations for different formats and arrangement of input matrices. Simplified, optimized, and general program code can be used in the kernel, which can speed up the kernel (and thus the GEMM operations). The described embodiments can also more efficiently use space/cache lines in the cache memory, which can improve the performance of the cache memory. Improving the performance of the GEMM operations and the cache memory can improve the overall performance of the electronic device while processing instances of input data through neural networks, which leads to increased user satisfaction.

Electronic Device

Figure 3:
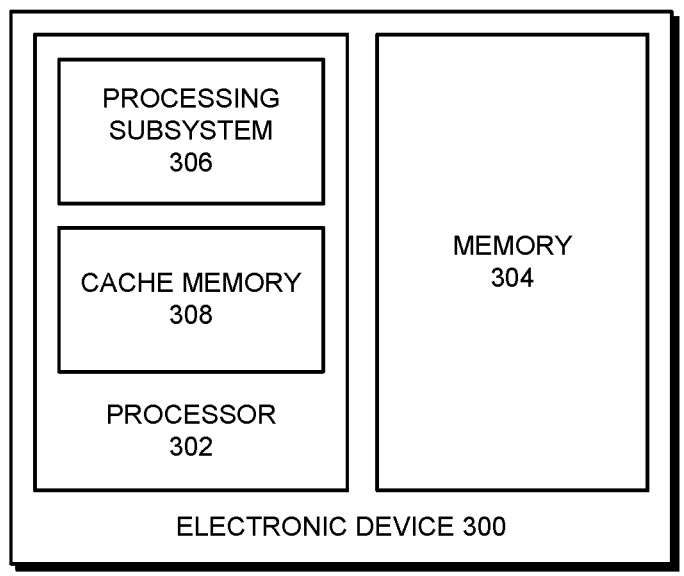
FIG. 3 presents a block diagram illustrating an electronic device in accordance with some embodiments.

FIG. 3 presents a block diagram illustrating electronic device 300 in accordance with some embodiments. Electronic device 300 includes processor 302 and memory 304. Generally, processor 302 and memory subsystem 304 are functional blocks that are implemented in hardware, i.e., using various circuitry, circuit elements, and devices. For example, processor 302 and memory 304 can be entirely implemented on one or more semiconductor chips, including on one or more separate semiconductor chips, can be implemented using semiconductor chips in combination with discrete circuit elements, can be implemented using discrete circuit elements alone, etc. Processor 302 and memory 304 perform operations associated with processing instances of input (or training) data through neural networks during training or when performing a task associated with the neural network (e.g., classification, etc.). For example, processor 302 and/or memory 304 perform operations for statically generating a compiled representation of an input matrix to be used for determining the location of data in the input matrix for subsequent GEMM operations.

Figure 4:
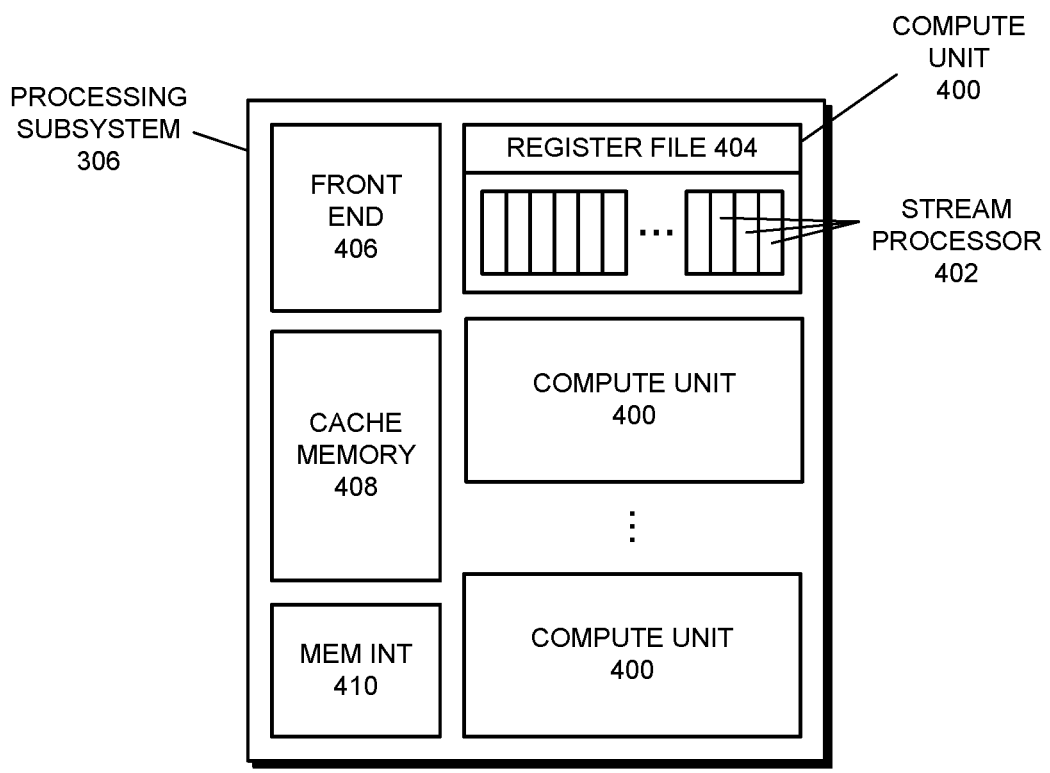
FIG. 4 presents a block diagram illustrating processing subsystem in accordance with some embodiments.

Processor 302 is a functional block that performs computational, memory access, and other operations in electronic device 300. Processor 302 includes processing subsystem 306 and cache memory 308. Processing subsystem 306 includes one or more functional blocks such as central processing unit (CPU) cores, graphics processing unit (GPU) cores, neural network processors/accelerators, embedded processors, and/or application specific integrated circuits (ASICs) that perform general purpose computational, control, and/or other operations. FIG. 4 presents a block diagram illustrating processing subsystem 306 in accordance with some embodiments. Generally, in FIG. 4, processing subsystem 306 is shown as including some of the same internal functional blocks as might be found in a general purpose GPU. Although a particular arrangement and number of elements is shown in processing subsystem 306, however, in some embodiments, a different number and/or arrangement of processing subsystem is used in processing subsystem 306. For example, in some embodiments, the internal functional blocks in processing subsystem 306 are similar to those that might be found in a CPU. As another example, in some embodiments, the internal functional blocks in processing subsystem 306 include a combination of functional blocks similar to those that might be found in both a CPU and a general purpose GPU.

As can be seen in FIG. 4, processing subsystem 306 includes a number of compute units 400, each of which (as shown only in the topmost compute unit 400) includes a number of stream processors 402 and a register file 404 (only three of the stream processors 402 are labeled for clarity). Each stream processor 402 is a functional block including processing circuitry (e.g., floating point or integer arithmetic logic units, logic circuitry, etc.) to be used for performing processing operations for one or more processing threads (or, more simply, "threads"). In some embodiments, each compute unit 400 supports multiple threads, e.g., 25, 50, or another number of threads, and the stream processors 402 in each compute unit 400 can be used for processing operations for multiple different threads (e.g., on demand, in time slices, in a round robin access pattern, etc.). Register file 404 is a functional block that includes memory circuitry for storing information and data for the stream processors 402. In some embodiments, register file 404 includes separate copies of memory circuitry for storing information and data for each of the individual threads. Front end 406 is a functional block that performs operations for scheduling threads for execution in the stream processors 402, receiving and decoding/interpreting commands, requests, messages, etc. from other entities in electronic device 300, communication with other entities in electronic device 300, etc. Cache memory 408 is a functional block that includes memory circuits for storing local copies of instructions, information, and/or data for compute units 400 (e.g., copies of instructions, information, and/or data acquired from cache memory 308, memory 304, and/or another source). Cache memory 408 is a higher-speed memory in which copies of instructions, information, and/or data (e.g., operands for computational operations, results from operations, instructions, configuration values, and/or other information) are stored in order to enable the instructions, information, and/or data to be accessed more rapidly than accessing the data in cache memory 308 or memory 304. In some embodiments, cache memory 408 is located closely to processing circuits in compute units 400 that access the copies of data in cache memory 408 and is connected to the processing circuits via a high-speed interface, thereby enabling rapid access of stored data. In some embodiments, cache memory 408 is used for storing a compiled representation of an input matrix to be used as described herein. Memory interface (MEM INT) 410 is a functional block that includes circuitry for accessing (e.g., reading, writing, invalidating, etc.) instructions, information, and data in cache memory 308, memory 304, and cache memory 408.

Cache memory 308 is a functional block that performs operations for storing copies of instructions, information, and data for access by processing subsystem 306 and possibly other entities in electronic device 300. Cache memory 308 is a higher-speed memory in which copies of data are stored in order to enable the data to be accessed more rapidly than accessing the data in memory 304. In some embodiments, cache memory 308 is located closely to processing circuits in processing subsystem 306 that access the copies of data in cache memory 308 and is connected to the processing circuits via a high-speed interface, thereby enabling rapid access of stored data. In some embodiments, cache memory 308 includes volatile memory circuits such as static random access memory (SRAM) circuits that are used for storing data.

Memory 304 is a functional block that performs operations of a memory (e.g., a "main" memory) in electronic device 300. Memory 304 includes memory circuits for storing instructions, information, and data for access by functional blocks in electronic device 300, as well as control circuits for handling accesses of data in the memory circuits. The memory circuits in memory 304 include volatile memory circuits such as fourth-generation double data rate synchronous dynamic random access memory (DDR4 SDRAM), static random access memory (SRAM), and/or other types of memory circuits. In some embodiments, copies of data are acquired from memory 304 and stored in cache memory 308 and cache memory 408 to enable more rapid access of the copies of the data.

Electronic device 300 is shown as including particular numbers and arrangements of elements (e.g., functional blocks and devices such as processor 302, memory 304, etc.). Electronic device 300, however, is simplified for illustrative purposes. In some embodiments, a different number or arrangement of elements is present in electronic device 300. For example, electronic device 300 can include power subsystems, human interface systems, etc. As another example, in some embodiments, electronic device 300 includes a mass storage device such as a disk drive or a higher-capacity integrated circuit memory that serves as non-volatile storage for data in electronic device 300—and from where copies of instructions, information, and data are acquired for storage in memory 304, cache memory 308, and/or cache memory 408. Generally, electronic device 300 includes sufficient elements to perform the operations herein described.

Electronic device 300 can be, or can be included in, any electronic device that performs neural network processing using input matrices. For example, electronic device 300 can be, or can be included in, electronic devices such as desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof.

Compiled Representation

In the described embodiments, a processing subsystem (e.g., processing subsystem 306) generates, for an input matrix to be used for processing instances of input data through a neural network, a compiled representation. The compiled representation is a reference, i.e., a listing, an index, etc., that can be used by a processing subsystem to determine the locations/addresses in a memory (e.g., memory 304) of elements in a higher-dimension input matrix (i.e., three or more dimensions), called, for convenience, input matrix A, that are to be used as inputs for a GEMM operation. In other words, the compiled representation serves as a conversion or mapping from the higher dimension input matrix A into the two dimension input matrix that is used for GEMM operations (i.e., for matrix-matrix multiplication operations and the like).

Figure 5:
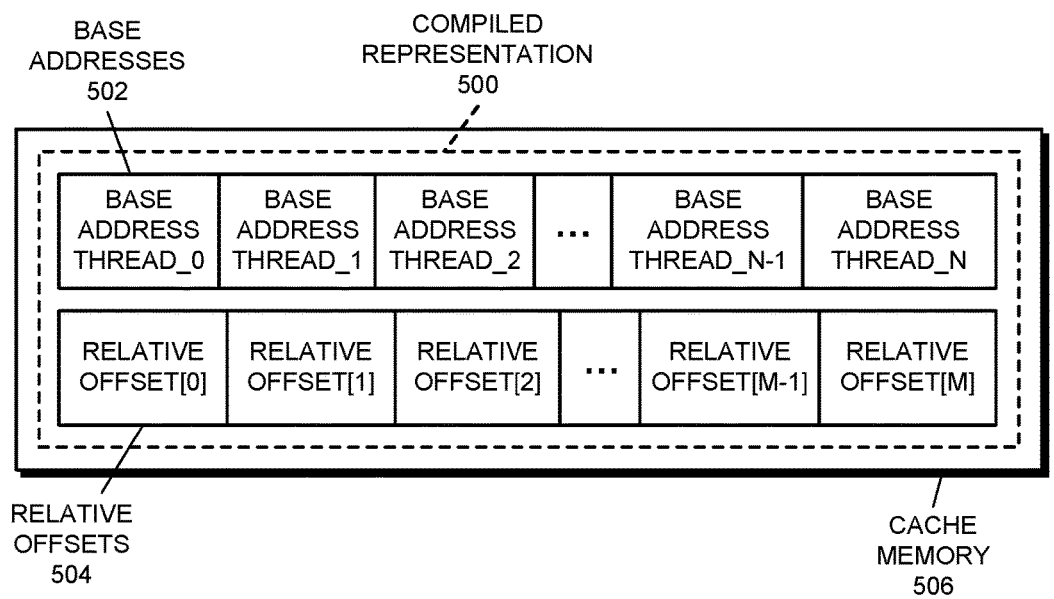
FIG. 5 presents a block diagram illustrating a compiled representation in accordance with some embodiments.

FIG. 5 presents a block diagram illustrating a compiled representation 500 in accordance with some embodiments. Compiled representation 500 includes a number of base addresses 502. Each base address is or includes an address (or other identifier) of a location in memory in input matrix A that serves as a base address for a respective different thread. The base address for each thread is used as a starting point in the memory for determining addresses or locations of elements in input matrix A from which values are acquired for processing by that thread in GEMM operations. For the example in FIG. 5, the processing subsystem supports N threads and thus compiled representation 500 includes N separate base addresses 502. Compiled representation 500 also includes a number of relative offsets 504. Each relative offset 504 is a displacement or offset value that is to be used along with the base addresses for determining addresses or locations of elements in input matrix A from which values are acquired.

Figure 6:
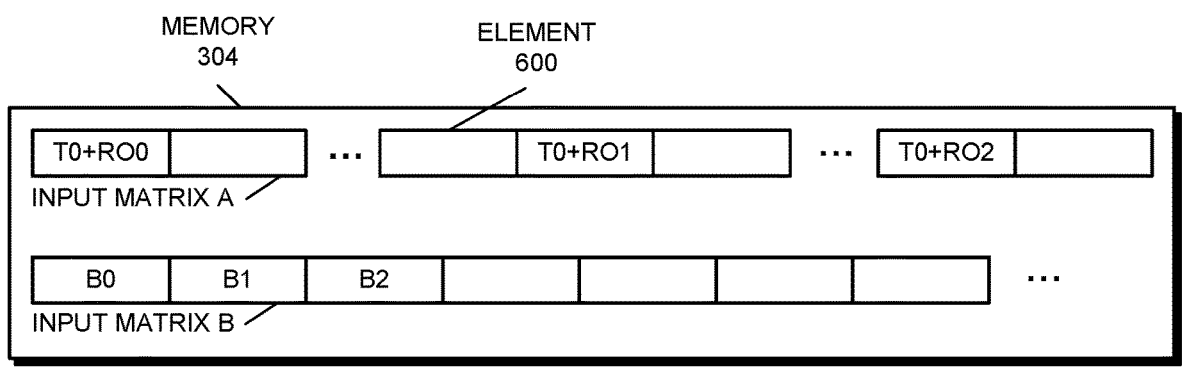
FIG. 6 presents a block diagram illustrating input matrices stored in a memory in accordance with some embodiments.

FIG. 6 presents a block diagram illustrating input matrix A and input matrix B in a memory in accordance with some embodiments. As can be seen in FIG. 6, each of input matrices A and B include a number of elements 600 (only one of which is labeled for clarity), each element 600 storing a value to be used in GEMM operations for processing an instance of input data through the neural network. For example, elements 600 of input matrix A may store input data values for nodes, feature extraction elements, or some other portion of a neural network, and the elements 600 of input matrix B may store weight values, filter values, or other values that are to be used as inputs for a GEMM operation. For instance, the input data may include values from pixels in an image to be classified, audio samples from a sound to be classified, image portions to be filtered in feature extraction elements, etc. Input matrices A and B are stored in memory in accordance with a format such as NCHW, etc.—and thus the elements and the values therein for instances of input data (or groups thereof) are organized to meet the specifications of the format.

Using the compiled representation in FIG. 5, elements in input matrix A to be processed in GEMM operations by a first thread (i.e., Thread_0 or T0) are determined using the base address for thread 0 plus the relative offsets. For example, as shown in FIG. 6, the first element (i.e., value therein) to be processed by thread 0 is the leftmost element in input matrix A, shown as T0+RO0 (i.e., base address thread_0 plus relative offset[0]). When processing instances of input data through the neural network, therefore, thread_0 first acquires the value in the leftmost element of input matrix A and processes the value in a GEMM operation. Note that the choice of the "leftmost" element is merely for the example in FIG. 6, in some embodiments, thread_0 starts from a different location in input matrix A, depending on the format of the data in input matrix A, the identity of the thread or other threads, etc. Continuing the example, the second element to be processed by thread 0 is the element shown as T0_RO1, which is base address thread_0 plus relative offset [1], and the third element to be processed by thread 0 is the element shown as T0_RO2, which is base address thread_0 plus relative offset[2]. In this way, using compiled representation 500, the described embodiments proceed, for each thread, from that thread's base address through input matrix A in a sequence of relative offsets, acquiring data and processing the data for GEMM operations.

In some embodiments, compiled representation 500 is arranged so that the elements in input matrix B (i.e., values therein) to be processed in GEMM operations along with elements from input matrix A have a specified relationship. Generally, the specified relationship is such that the acquisition of values from elements in input matrix B requires minimal computation, e.g., incrementing or otherwise increasing an element pointer for input matrix B. For the example in FIG. 6, elements are accessed by threads in input matrix B in a sequential or linear fashion from a base address for input matrix B. The base address for input matrix B is not, as in compiled representation 500, a per-thread address, but is instead a base address in memory for input matrix B itself. In these embodiments, therefore, and as shown in FIG. 6, the element of input matrix B that is acquired to be processed along with element T0+RO0 in input matrix A is element B0, element of input matrix B that is acquired to be processed along with element T0+RO1 in input matrix A is element B1, and the element of input matrix B that is acquired to be processed along with element T0+RO2 in input matrix A is element B2. In the example in FIG. 6, therefore, as the processing subsystem proceeds through compiled representation 500 to determine addresses for elements in input matrix A, the processing subsystem simply increments the element pointer for input matrix B to acquire values from the corresponding elements in input matrix B.

In some embodiments, compiled representation 500 is stored in cache memory 506, which is a local cache memory for the processing subsystem (e.g., cache memory 408 in processing subsystem 306, etc.). Because compiled representation 500 is stored in cache memory 506, base addresses 502 and relative offsets 504 can be more quickly acquired (than from, e.g., memory 304) and used for determining addresses of elements in memory.

Process for Generating a Compiled Representation

Figure 7:
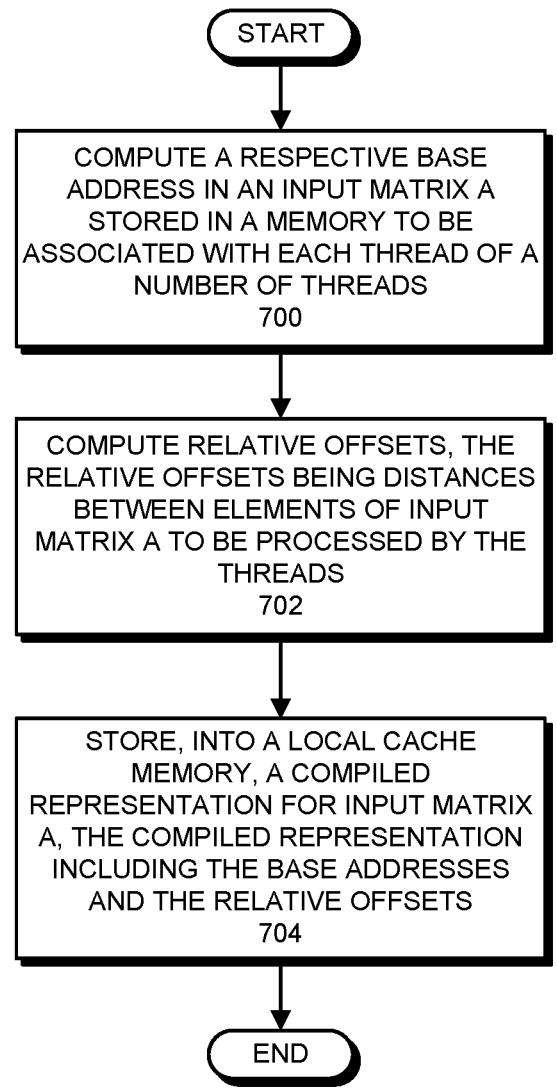
FIG. 7 presents a flowchart illustrating a process for generating a compiled representation in accordance with some embodiments.

In the described embodiments, a processing subsystem (e.g., processing subsystem 306) generates a compiled representation for an input matrix that includes information to be used for locating elements of the input matrix in a memory for GEMM operations when processing instances of input data through a neural network. FIG. 7 presents a flowchart illustrating a process for generating a compiled representation in accordance with some embodiments. Note that the operations shown in FIG. 7 are presented as a general example of operations performed by some embodiments. The operations performed by other embodiments include different operations, operations that are performed in a different order, and/or operations that are performed by different entities or functional blocks. For example, FIG. 7 is described using a convolutional neural network, having feature processing elements, filters, etc., but the operations, appropriately adjusted, may be performed for other types of neural networks, such as fully connected neural networks, etc.

For the operations in FIG. 7, it is assumed that input matrix A is stored in a memory (e.g., memory 304) and is thus available for the static generation of a compiled representation. It is also assumed that input matrix A has a number of elements (e.g., elements 600) in which are stored data to be used for processing instances of input data through a neural network. For example, the elements in input matrix A may store data such as values for pixels or regions of pixels in an image for processing in a neural network that classifies images. It is further assumed that the data in input matrix A is organized in more than two dimensions, such as being organized in the well known four dimensional NCHW (where N=batch, C=channel, H=height, W=width) or CNHW formats, the five dimensional NCHWVector format, etc.

FIG. 8 presents a key describing factors or values used in expressions for describing operations in FIGS. 7 and 9-10 in accordance with some embodiments. Generally, the factors or values are properties or characteristics of the neural network or the instances of input data (or groups thereof), an input matrix for processing instances of input data through the neural network, and an output matrix to be generated when processing instances of input data through the neural network. As can be seen in FIG. 8, the factors or values include: WI—width of input matrix A; HI—height of input matrix A; R—width of filter used in feature processing elements; S—height of filter used in feature processing elements; SU—filter U-stride used in feature processing elements; SV—filter V-stride used in feature processing elements; DU—filter U-dilation used in feature processing elements; DV—filter V-dilation used in feature processing elements; WO—width of output matrix C; HO—height of output matrix C; INC—input channels; and ONC—output channels. As described above, these factors and values are used for a neural network with feature processing elements such as a convolutional neural network, but the principles described for FIGS. 7-10 are similar for the generation of compiled representations for other types of neural networks.

The operations in FIG. 7 start when a processing subsystem computes a respective base address in input matrix A stored in the memory to be associated with each thread of a number of threads (step 700). For this operation, the processing subsystem computes a base address (e.g., base addresses 502) for each thread, that base address subsequently being used to determine a starting point in input matrix A for elements from where values are acquired for processing by that thread. FIG. 9 presents a pseudocode example of the computation of base addresses for the compiled representation in accordance with some embodiments. As can be seen in FIG. 9, when computing base addresses, the processing subsystem computes intermediate values PIX and IBS as respective functions of a thread identifier (TID) for each thread and a combination of factors and values as described for FIG. 8. The processing subsystem then computes a base address for each thread (BASE_ADDR_A[TID]) using PIX and IBS along with a combination of factors and values as described for FIG. 8. Note that SIZEOF(ELEM_TYPE) in the expression in FIG. 9 is the size of an element in input matrix A (e.g., in bytes, etc.). In addition, although FIG. 9 is presented as a general example, in some embodiments, different operations and/or a different order of operations are performed to compute the base addresses.

In some embodiments, the processing subsystem also stores, in the compiled representation, a base address for a second input matrix, input matrix B. As described above, in some of these embodiments, the compiled representation does not include per-thread base address information for input matrix B and thus the base address is simply a location (e.g., address, pointer, etc.) in memory from where the elements of input matrix B are to be found in sequence. In some embodiments, however, the base address for input matrix B is a variable, pointer, or other value that is managed separately from the compiled representation.

The processing subsystem then computes relative offsets for the threads, the relative offsets being distances between elements of input matrix A to be processed by the threads (step 702). For this operation, the processing subsystem computes a set of relative offsets (e.g., relative offsets 504) that are subsequently used in combination with the base addresses for each thread to determine the elements in input matrix A to be processed by that thread. FIG. 10 presents a pseudocode example of the computation of relative offsets for the compiled representation in accordance with some embodiments. As can be seen in FIG. 10, when computing relative offsets, the processing subsystem, using counters C, V, and U, which are limited based on certain factors and values as described for FIG. 8, computes each of the relative offsets (RELO). Note that SIZEOF(ELEM_TYPE) in the expression in FIG. 10 is the size of an element in input matrix A. In addition, although FIG. 10 is presented as a general example, in some embodiments, different operations and/or a different order of operations are performed to compute the relative offsets.

In some embodiments, the compiled representation is organized so that data is acquired from input matrix A and/or input matrix B in such a way to promote the reuse of data in cache lines in the local cache. In these embodiments, data values used by two or more threads in sequence (i.e., during neighboring sequential GEMM operations) or nearby one another in time can be acquired from memory together (e.g., in sequential memory read operations) and stored in respective portions of a single cache line. In this way, the data is available in the cache for all of the two or more threads—and can help to avoid the eviction of useful data from the cache by not requiring multiple cache lines be loaded to the cache memory in order to fulfill the data needs of the two or more threads.

The processing subsystem then stores, into a local cache memory (e.g., cache memory 308 or cache memory 408) the compiled representation for input matrix A, the compiled representation including the base addresses and the relative offsets (step 704). For this operation, in some embodiments, the processing subsystem stores the compiled representation into the cache memory in a format or arrangement such as is shown in FIG. 5. Generally, the processing subsystem stores the compiled representation into the cache memory to be used for future processing of instances of input data through the neural network. In some embodiments, along with or as an alternative to storing the compiled representation in the cache memory, the processing subsystem stores the compiled representation in a non-volatile memory or communicates the compiled representation to another electronic device for storage thereby (e.g., via a communication network, etc.). In these embodiments, the compiled representation is prepared in advance for use in future processing of instances of input data through the neural network— including possibly by processing subsystems in separate/ different electronic devices.

In the described embodiments, the compiled representation is "statically" generated, and is thus prepared in advance for use in determining addresses of memory locations during the GEMM operation. Statically, as used herein, means that the compiled representation is generated at a time prior to when instances of input data are processed using the GEMM operation—and possibly a relatively long time (e.g., hours, days, etc.) before the instances of input data are processed. For example, a compiled representation may be generated for input matrices as part of a data preparation step before the data itself is processed through the neural network. In other words, the statically generated compiled representation can be separately generated and stored (e.g., in a local cache memory, in the memory, etc.) in preparation for subsequently processing instances of input data through the neural network. The static generation of the compiled representation can be contrasted with the dynamic or real-time computation of memory addresses for elements in input matrices A and/or B on the fly.

In the described embodiments, the compiled representation is configured so that the program code used for performing GEMM operations, e.g., in kernels (or other arrangements of program code), is generic with regard to the dimensions and/or formats of data in input matrices. The kernels therefore need only perform the simple address computations (e.g., base addresses plus relative offsets) described herein for using the compiled representations. By using a generic kernel with the compiled representation, many dimensions and/or formats of input matrices may be used without requiring multiple kernels and/or program code in the kernels for handling the different dimensions and/or formats of the input matrices. In some embodiments, a single kernel can be developed that uses the compiled representation. In some of these embodiments, the program code for statically generating the compiled representation as described herein handles the various dimensions and/or formats of the input matrices.

Figure 11:
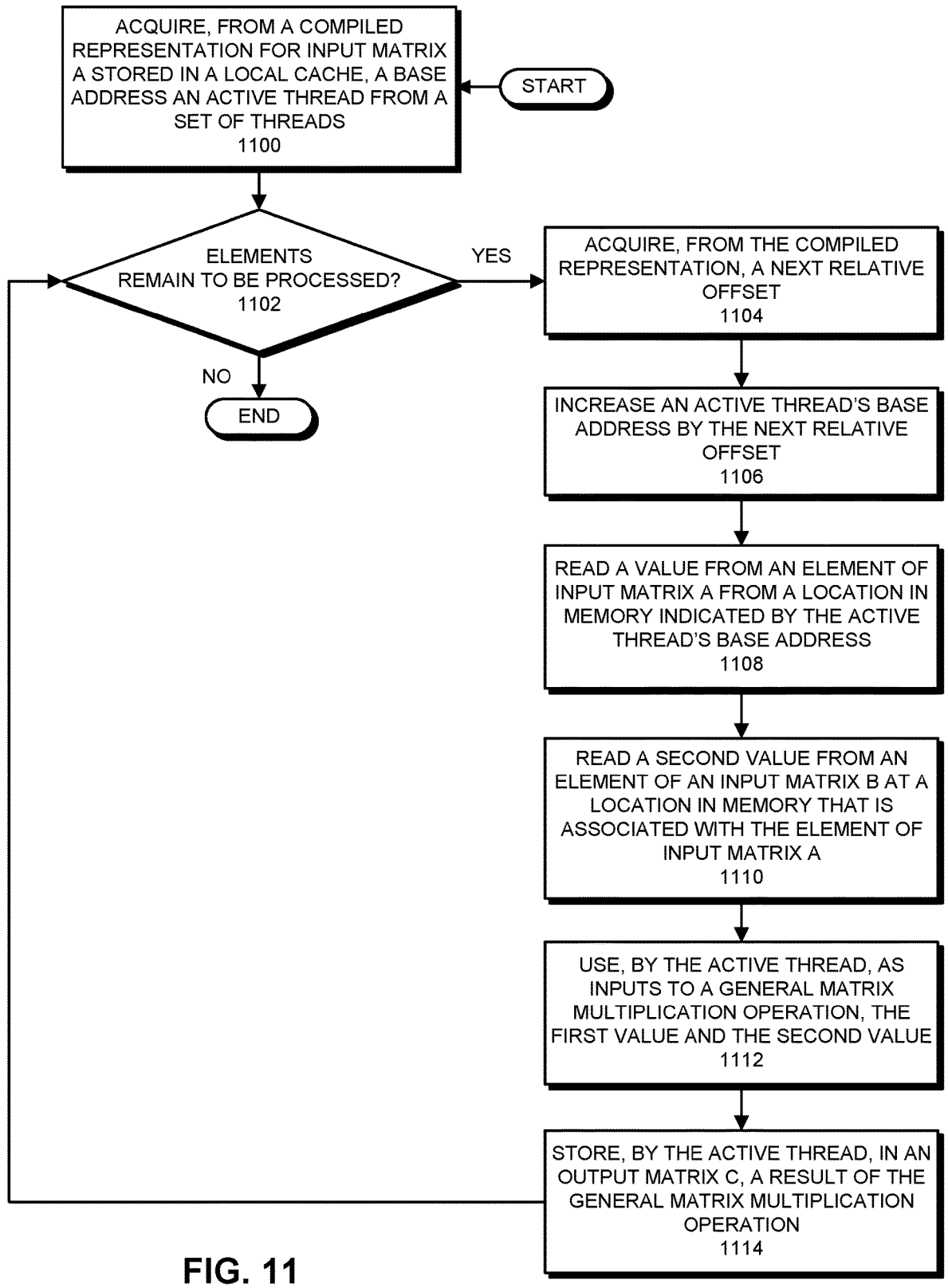
FIG. 11 presents a flowchart illustrating a process for using a compiled representation in accordance with some embodiments.

Although particular computations of the base addresses and relative offsets, as presented in FIGS. 9-10, are described as examples, in some embodiments, different computations are used. For example, different computations are used for generating the base addresses and/or relative offsets for different dimensions and/or formats of input data, for different types of neural networks, etc. Generally, in the described embodiments, base addresses and relative offsets with the properties described herein are computed when generating the compiled representation for input matrices.
Process for Using a Compiled Representation In the described embodiments, a processing subsystem uses a compiled representation to acquire data from an input matrix to be used for GEMM operations when processing instances of input data through a neural network. FIG. 11 presents a flowchart illustrating a process for using a compiled representation in accordance with some embodiments. Note that the operations shown in FIG. 11 are presented as a general example of operations performed by some embodiments. The operations performed by other embodiments include different operations, operations that are performed in a different order, and/or operations that are performed by different entities or functional blocks. For example, FIG. 11 is described using a convolutional neural network, having feature processing elements, filters, etc., but the operations, appropriately adjusted, may be performed for other types of neural networks, such as fully connected neural networks, etc.

For the operations in FIG. 11, it is assumed that the compiled representation is stored in a local cache memory (e.g., cache memory 308 or cache memory 408) for a processing subsystem and is thus available for use in locating elements of input matrix A for a GEMM operation. In other words, in some embodiments, the compiled representation was previously statically generated using the process described in FIG. 7 and stored in the cache memory (perhaps a relatively long time prior to the use in FIG. 11). In addition, it is assumed that input matrices A and B are stored in a memory (e.g., memory 304). Input matrices A and B each have a number of elements (e.g., elements 600) in which are stored data to be used for processing instances of input data through a neural network. For example, the elements in input matrix A may store data such as values for pixels or regions of pixels in an image for processing in a neural network that classifies images and the elements in input matrix B may store filter values or weights. The data in each of input matrices A and B is organized in more than two dimensions, such as being organized in the well known four dimensional NCHW (where N=batch, C=channel, H=height, W=width) or CNHW formats, the five dimensional NCHWVector format, etc.

FIG. 8 presents a key describing factors or values used in expressions for describing operations in FIGS. 11 and 12 in accordance with some embodiments. The factors and values shown in FIG. 8 are used for a neural network with feature processing elements such as a convolutional neural network, but the principles described for FIGS. 8 and 11-12 are similar for the use of compiled representations for other types of neural networks.

The operations in FIG. 11 start when a processing subsystem acquires, from the compiled representation for input matrix A stored in the local cache, a base address for an active thread (step 1100). For this operation, the processing subsystem reads a listing of base addresses for a set of threads (e.g., base addresses 502) from the compiled representation in the local cache to acquire the respective base address for the active thread. In some embodiments, the processing subsystem performs this operation as the active thread becomes active (i.e., is used for processing values from elements in input matrix A) and then retains the base address for the active thread (e.g., in a register or memory element). FIG. 12 presents a pseudocode example of using a compiled representation in accordance with some embodiments. The first few lines of the pseudocode in FIG. 12 illustrate the acquisition of the base address for the active thread. Note that, although FIG. 12 is presented as an example, in some embodiments, different operations and/or a different order of operations are performed to use a compiled representation.

When elements remain to be processed by the active thread (step 1102), the processing subsystem acquires, from the compiled representation, a next relative offset (step 1104). For this operation, the processing subsystem proceeds to a next relative offset from among a set of relative offsets stored in sequence in the compiled representation and reads the next relative offset. For example, the processing subsystem can increment a counter used for determining which relative offset is to be used and then acquire the associated relative offset (or vice versa). In this way, the processing subsystem works through the relative offsets in the compiled representation one at a time, acquiring each available relative offset for processing corresponding values from input matrix A. The acquisition of the relative offset is shown in FIG. 12 where URO is set equal to the Kth element of a RELO (Relative Offset) matrix or vector (noting that, in some embodiments, the relative offsets are stored in elements of a matrix or vector).

Note that, although only one thread is described for FIG. 11, in some embodiments, the relative offsets are used in the same way for all of the threads by the processing subsystem. The location of each element in input matrix A to be processed by a given thread is therefore computed using the base address for the given thread and a corresponding relative offset from among the relative offsets in the relative offset matrix, vector, etc. As can be seen in FIG. 12, in some embodiments, the location of each element in input matrix A for to be processed by a given thread is computed as a running sum starting with an original value of the base address for the given thread and adding each relative offset (URO) to increase the present value of the base address, as described herein.

The processing subsystem then increases the active thread's base address by the next relative offset (step 1106). During this operation, the processing subsystem advances the base address, which is used for retrieving data, to a next location in the memory based on the next relative offset—and thus to next element in input matrix A. For example, if the prior value of the base address was PV and the relative offset is RO, e.g., 15 elements, 100 bytes, etc., the base address PV is increased by RO, i.e., PV+RO is computed. The increasing of the base address is shown in FIG. 12 as the increasing of AVO by URO.

The processing subsystem then reads a first value from an element of input matrix A from the location in memory indicated by the active thread's base address (step 1108). During this operation, the processing subsystem performs a memory read operation using the active thread's base address (or another value determined using the active thread's base address) that causes the memory to return a value from an element of input matrix A indicated by the active thread's base address. FIG. 12 shows this operation as A=SCALAR_BASE_A[AVO]. The processing subsystem also reads a second value from an element of input matrix B at a location in memory that is associated with the element in input matrix A (step 1110). During this operation, the processing subsystem performs a memory read using an offset within input matrix B based on the next relative offset that is used for acquiring the value from input matrix A. For example, if the processing subsystem is using the 13th relative offset, the input within input matrix B is 13. This is shown in FIG. 12 as B=SCALAR_BASE_B[K] (recalling that the Kth element of the relative offsets was read for acquiring data from input matrix A).

The active thread then uses, as inputs to a GEMM operation, the first value and the second value (step 1112). For this operation, the active thread, executing on underlying processor hardware (e.g., a pipeline, a stream processor, etc.), performs a respective portion of the GEMM operation. For the example in FIG. 12, the GEMM operation is shown as a fused multiply accumulate (FMA) operation, C+=A*B. The active thread then stores a result of the GEMM operation in an output matrix C (step 1114). The storing of the result of the GEMM operation is shown in the final if statement in FIG. 12, which includes C[OUTPUT_IDX]=C.

The processing subsystem then returns to step 1102 to determine if elements remain to be processed. If there are no remaining elements to be processed, the process ends. Otherwise, if there are remaining elements to be processed, the processing subsystem continues to step 1104.

FIG. 13 presents an example of using a compiled representation in accordance with some embodiments. For the example in FIG. 13, each of four threads on the processing subsystem are used for computing a separate output, each of the outputs being the convolution of values from elements from a set of elements from input matrix A (A0, A1, etc.) with values from input matrix B. As can be seen in FIG. 13, the factors and values (as described for FIG. 8) are assumed to have respective values, e.g., WS=4, HS=4, etc. With regard to the values in the compiled representation, the base addresses (START_ADDR_A[ ]) for the four threads are 0, 1, 4, and 5 and the relative offsets (RELO) are 0, 1, 2, 4, etc. In addition, the elements in input matrix A (A[HS][WS]) are assumed to store values 1, 3, 2, 7, etc. and the elements in input matrix B (B[R][S]) are assumed to store values 00, 01, 02, etc. FIG. 14 presents an example of the sets (or blocks) of elements of input matrix A in accordance with some embodiments. As can be seen in FIG. 14, each thread processes a different set of elements from input matrix A with each set of elements starting at a respective starting address for that thread (or, more generally, location) in input matrix A and being located at corresponding offsets from the relative offsets. In a first set of computations by thread 0 (i.e., an active thread) in FIG. 13, an FMA is computed in which values from input matrix A (e.g., A0[RELO[0], A0[RELO[1], etc.) are multiplied by corresponding values from input matrix B (e.g., B[0][0], B[0][1], etc.) and the sum of the products is written to/stored in C[0][0], i.e., a location in the output matrix C. In the three remaining sets of computations for threads1-3, FMAs are computed in which respective values from input matrix A are multiplied by corresponding values from input matrix B and the sum of the products is written to/stored in a location in the output matrix C.

Note that the operations and values shown in FIGS. 13-14 are presented as an example of operations performed and values used by some embodiments. The operations performed by other embodiments include different operations, operations that are performed in a different order, and/or operations that are performed by different entities or functional blocks. For example, FIGS. 13-14 are described using a convolutional neural network, having feature processing elements, filters, etc., but the operations, appropriately adjusted, may be performed for other types of neural networks, such as fully connected neural networks, etc.

Alternative Generation of Compiled Representation

Figure 15:
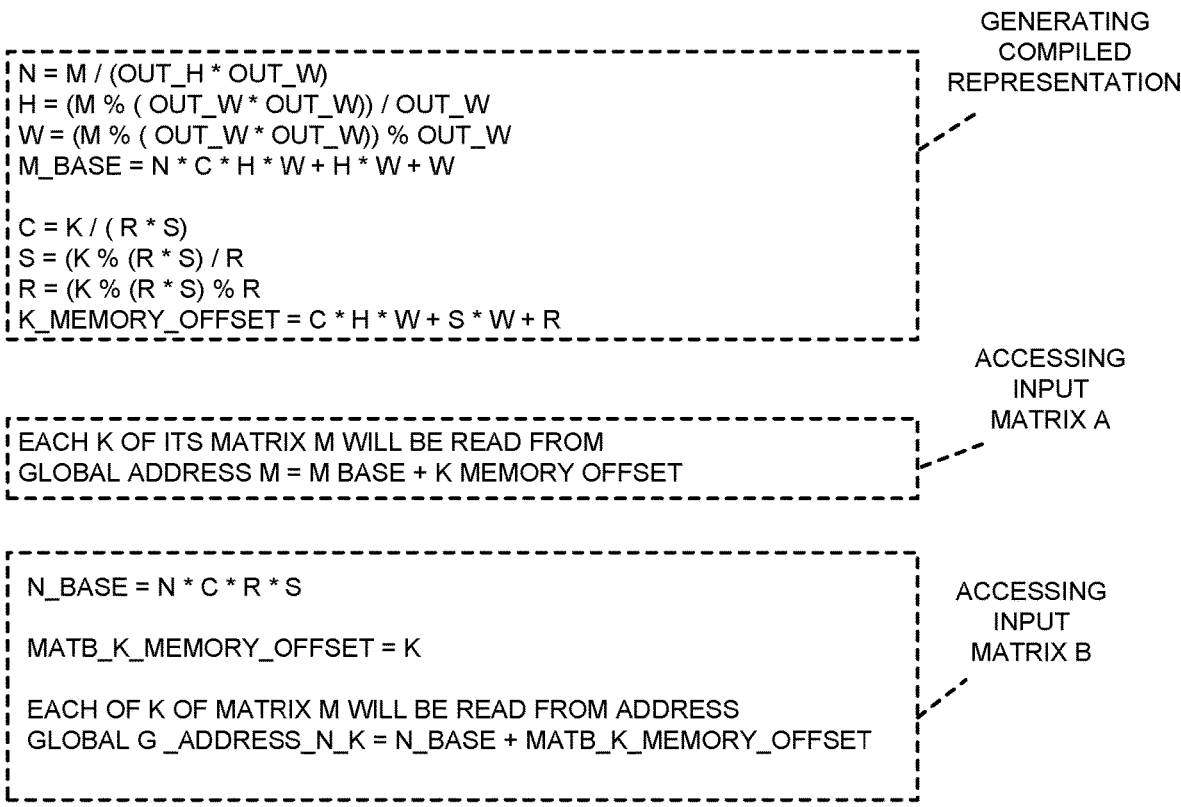
FIG. 15 presents a pseudocode example of generating a compiled representation in accordance with some embodiments.

As described above, the examples in FIGS. 7-14 are provided in order to illustrate the generation and use of a compiled representation in some embodiments. In some other embodiments, however, different operations, values, etc. are used for generating and/or using the compiled representation. FIG. 15 presents a pseudocode example of generating a compiled representation in accordance with some embodiments. Note that the operations shown in FIG. 15 are presented as a general example of operations performed by some embodiments. The operations performed by other embodiments include different operations, operations that are performed in a different order, and/or operations that are performed by different entities or functional blocks. For example, FIG. 15 is described using a convolutional neural network, having feature processing elements, filters, etc., but the operations, appropriately adjusted, may be performed for other types of neural networks, such as fully connected neural networks, etc.

For the example in FIG. 15, the factors and values that are used in the generation of the compiled representation are shown in the top left corner of the figure. As can be seen, N—batch size, C—input channels, etc. The factors and values, while having some similarity to those shown in FIG. 8, are separately and differently defined—and used—in FIG. 15. As can be seen in FIG. 15, the base addresses for the compiled representation are computed as M_BASE=N*C*H*W+H*W+W, with factors N, H, and W being themselves computed as shown. In addition, the relative offsets are computed as K_MEMORY_OFFSET=C*H*W+S*W+R. As shown in FIG. 15, the base addresses and relative offsets are used together to determine an address in memory where data is located in input matrix A as GLOBAL ADDRESS M=M_BASE+K MEMORY OFFSET. It is also noted that elements of input matrix B are accessed using a base address for input matrix B, N_BASE and corresponding memory offsets.

In some embodiments, at least one electronic device (e.g., electronic device 300) uses code and/or data stored on a non-transitory computer-readable storage medium to perform some or all of the operations herein described. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, neural network processors, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (program code, firmware, etc.), perform the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 300 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
   a local cache memory;

a memory, the memory storing input matrix A, input matrix A having values to be used when processing instances of input data through a neural network; and a processor, the processor configured to:
generate a compiled representation that includes values for acquiring data from input matrix A when processing instances of input data through the neural network, the values including a base address in input matrix A for each thread from among a number of threads and relative offsets, the relative offsets being distances between elements of input matrix A to be processed by the threads; and store, in the local cache memory, the compiled representation including the base address for each thread and the relative offsets.

2. The electronic device of claim 1, wherein, when generating the compiled representation, the processor is configured to:
compute the base address for each thread in input matrix A as a function of some or all of a thread identifier (ID) for that thread, dimensions of input matrix A and/or an output matrix C, properties of elements of input matrix A and/or output matrix C, and convolutional filter properties.

3. The electronic device of claim 1, wherein, when generating the compiled representation, the processor is configured to:
compute the relative offsets as a function of some or all of dimensions of input matrix A and/or an output matrix C, properties of elements of input matrix A and/or output matrix C, and filter properties.

4. The electronic device of claim 1, wherein:
the memory stores input matrix B, input matrix B having values to be used when processing instances of input data through the neural network; and
the processor is further configured to:
process input matrix A using each of the threads, the processing including using the compiled representation in the local cache memory to identify locations in memory from which values in elements of input matrix A are to be acquired to be used, along with values from elements at corresponding locations from input matrix B, as inputs for one or more general matrix multiplication (GEMM) operations by that thread.

5. The electronic device of claim 4, wherein, when processing input matrix A using each of the threads, the processor is configured to:
acquire, from the compiled representation for input matrix A in the local cache memory, the base address for each thread for input matrix A;
while elements of input matrix A remain to be processed, for an active thread from among the threads:
acquire, from the compiled representation, a next relative offset;
increase that active thread's base address by the next relative offset;
read a first value from an element of input matrix A at a location in the memory identified by that active thread's base address;
read a second value from an element of input matrix B at a memory location associated with the element of input matrix A;
use, as inputs to a GEMM operation, the first value and the second value; and
store, in an output matrix C in the memory, a result of the GEMM operation.

6. The electronic device of claim 5, wherein the processor is further configured to use an index for acquiring the relative offsets in combination with a base address for input matrix B for reading the second value from input matrix B.

7. The electronic device of claim 5, wherein, when storing, in output matrix C, each result of the GEMM operation, the processor is further configured to:
store each result in output matrix C at a location in output matrix C that is determined based on a location in input matrix A from where the first value was read.

8. The electronic device of claim 4, wherein the values in input matrix A and input matrix B include input values and weights, respectively, associated with instances of input data to be used for processing the instances of input data through the neural network.

9. The electronic device of claim 4, wherein dimensions of input matrix A and input matrix B are greater than dimensions used for the GEMM operations.

10. The electronic device of claim 1, wherein the local cache memory is coupled to processing circuitry in the processor via a fast-access interface that enables faster accesses than accesses of the memory.

11. A method for generating a compiled representation in an electronic device that includes a local cache memory; a memory, the memory storing an input matrix A, input matrix A having values to be used when processing instances of input data through a neural network; and a processor, the method comprising:
generating, by the processor, a compiled representation that includes values for acquiring data from input matrix A when processing instances of input data through the neural network, the values including a base address in input matrix A for each thread from among a number of threads and relative offsets, the relative offsets being distances between elements of input matrix A to be processed by the threads; and
storing, by the processor, in the local cache memory, the compiled representation including the base address for each thread and the relative offsets.

12. The method of claim 11, wherein generating the compiled representation comprises:
computing, by the processor, the base address for each thread in input matrix A as a function of some or all of a thread identifier (ID) for that thread, dimensions of input matrix A and/or an output matrix C, properties of elements of input matrix A and/or output matrix C, and convolutional filter properties.

13. The method of claim 11, wherein generating the compiled representation comprises:
computing, by the processor, the relative offsets for input matrix A as a function of some or all of dimensions of input matrix A and/or an output matrix C, properties of elements of input matrix A and/or output matrix C, and filter properties.

14. The method of claim 11, wherein:
the memory stores an input matrix B, input matrix B having values to be used when processing instances of input data through the neural network; and
the method further comprises:
processing, by the processor, input matrix A using each of the threads, the processing including using the compiled representation in the local cache memory to identify locations in memory from which values in elements of input matrix A are to be acquired to be used, along with values from elements at corresponding locations from input matrix B, as inputs for one or more general matrix multiplication (GEMM) operations by that thread.

15. The method of claim 14, wherein processing input matrix A using each of the threads includes:
   acquiring, by the processor, from the compiled representation for input matrix A in the local cache memory, the base address for each thread for input matrix A and the relative offsets;
   while elements of input matrix A remain to be processed, for an active thread from among the threads:
      read, by the processor, a first value from an element of input matrix A at a location in the memory identified by that active thread's base address for input matrix A as adjusted by a corresponding relative offset;
      read, by the processor, a second value from an element of input matrix B at a memory location associated with the element of input matrix A;
      use, by the processor, as inputs to a GEMM operation, the first value and the second value; and
      store, by the processor, in an output matrix C in the memory, a result of the GEMM operation.

16. The method of claim 15, further comprising:
   using, by the processor, an index for acquiring the relative offsets in combination with a base address for input matrix B for reading the second value from input matrix B.

17. The method of claim 15, wherein storing, in output matrix C, each result of the GEMM operation includes:
   storing, by the processor, each result in output matrix C at a location in output matrix C that is determined based on a location in input matrix A from where the first value was read.

18. The method of claim 14, wherein the values in input matrix A and input matrix B include input values and weights, respectively, associated with instances of input data to be used for processing the instances of input data through the neural network.

19. The method of claim 14, wherein dimensions of input matrix A and input matrix B are greater than dimensions used for the GEMM operations.

20. An electronic device, comprising:
   a memory storing input matrix A and input matrix B, input matrix A and input matrix B having respective values to be used when processing instances of input data through a neural network;
   a local cache memory that stores a compiled representation, the compiled representation including values for acquiring data from input matrix A when processing instances of input data through the neural network, the values including a base address in input matrix A for each thread from among a number of threads and relative offsets, the relative offsets being distances between elements of input matrix A to be processed by the threads; and
   a processor configured to:
      acquire, from the local cache memory, the compiled representation; and
      process input matrix A by, for each thread from among the number of threads, using the compiled representation to identify locations in memory from which values in elements of input matrix A are to be acquired to be used, along with values from elements at corresponding locations from input matrix B, as inputs for one or more general matrix multiplication (GEMM) operations by that thread.

21. The electronic device of claim 20, wherein, when processing input matrix A, the processor is configured to:
   acquire, from the compiled representation for input matrix A in the local cache memory, the base address for each thread for input matrix A;
   while elements of input matrix A remain to be processed, for an active thread from among the threads:
      acquire, from the compiled representation, a next relative offset;
      increase that active thread's base address by the next relative offset;
      read a first value from an element of input matrix A at a location in the memory identified by that active thread's base address;
      read a second value from an element of input matrix B at a memory location associated with the element of input matrix A;
      use, as inputs to a GEMM operation, the first value and the second value; and
      store, in an output matrix C in the memory, a result of the GEMM operation.

22. The electronic device of claim 21, wherein the processor is further configured to use an index for acquiring the relative offsets in combination with a base address for input matrix B for reading the second value from input matrix B.

23. The electronic device of claim 21, wherein, when storing, in output matrix C, the results of the GEMM operation, the processor is further configured to:
   store each result in output matrix C at a location in output matrix C that is determined based on a location in input matrix A from where the first value was read.

24. A method for processing instances of input data through a neural network in an electronic device that includes a local cache memory that stores a compiled representation; a memory storing input matrix A and input matrix B, input matrix A and input matrix B having respective values to be used when processing instances of input data through the neural network; and a processor, the method comprising:
   acquiring, by the processor, from the local cache memory, the compiled representation, the compiled representation including values for acquiring data from input matrix A when processing instances of input data through the neural network, the values including a base address in input matrix A for each thread from among a number of threads and relative offsets, the relative offsets being distances between elements of input matrix A to be processed by the threads; and
   processing, by the processor, input matrix A by, for each thread from among the number of threads, using the compiled representation to identify locations in memory from which values in elements of input matrix A are to be acquired to be used, along with values from elements at corresponding locations from input matrix B, as inputs for one or more general matrix multiplication (GEMM) operations by that thread.

25. The method of claim 24, wherein processing input matrix A comprises:
   acquiring, by the processor, from the compiled representation for input matrix A in the local cache memory, the base address for each thread for input matrix A;
   while elements of input matrix A remain to be processed, for an active thread from among the threads:
      acquiring, by the processor, from the compiled representation, a next relative offset;
      increasing, by the processor, that active thread's base address by the next relative offset;

reading, by the processor, a first value from an element of input matrix A at a location in the memory identified by that active thread's base address;

reading, by the processor, a second value from an element of input matrix B at a memory location associated with the element of input matrix A;

using, by the processor, as inputs to a GEMM operation, the first value and the second value; and storing, by the processor, in an output matrix C in the memory, a result of the GEMM operation.

26. The method of claim 25, further comprising using, by the processor, an index for acquiring the relative offsets in combination with a base address for input matrix B for reading the second value from input matrix B.

27. The method of claim 25, wherein, storing, in output matrix C, each result of the GEMM operation, comprises:

storing, by the processor, each result in output matrix C at a location in output matrix C that is determined based on a location in input matrix A from where the first value was read.

* * * * *